United States Patent [19]

Kirscher

[11] Patent Number: 4,777,707

[45] Date of Patent: Oct. 18, 1988

[54] MILLING MACHINE FOR PRESS BRAKE

[76] Inventor: Robert B. Kirscher, 10105 S. Eleanor Ave., Palos Hills, Ill. 60465

[21] Appl. No.: 55,251

[22] Filed: May 29, 1987

[51] Int. Cl.$^4$ .................... B23C 7/00; B23Q 11/00
[52] U.S. Cl. ..................... 29/33 R; 51/241 S; 409/178
[58] Field of Search ............. 409/175, 178, 235, 138; 51/241 S, 244 G, 246, 72 R, 249; 29/33 R; 144/134 B, 134 C; 83/174, 174.1

[56] References Cited

U.S. PATENT DOCUMENTS

| 2,660,096 | 11/1953 | Morton | 409/178 |
| 3,382,768 | 5/1968 | Mount | 409/178 |
| 4,102,245 | 7/1978 | Cousins | 409/178 X |
| 4,162,565 | 7/1979 | Rubenzer | 29/33 R |

FOREIGN PATENT DOCUMENTS

| 1110412 | 2/1956 | France | 51/241 S |
| 327105 | 10/1919 | Fed. Rep. of Germany | 409/175 |
| 153001 | 3/1963 | U.S.S.R. | 409/178 |
| 553056 | 5/1977 | U.S.S.R. | 409/175 |
| 908975 | 10/1962 | United Kingdom | 51/241 S |

Primary Examiner—William R. Briggs
Attorney, Agent, or Firm—Augustus G. Douvas

[57] ABSTRACT

A press brake having bed and ram members whose tool-holding faces, edges and surfaces need reconditioning due to wear, and a portable milling machine adapted to be fixed to the press brake to mill and thus recondition the faces, edges and surfaces. An improved milling machine comprising an elongated carriage-support assembly supported on the bed and separated from the ram, a milling-head assembly having a carriage and a set of cutters seated on the carriage with the milling-head assembly being mounted on the carriage-support assembly, and a carriage-feed drive assembly coupled to the carriage to drive the milling-head assembly the length of the carriage-support assembly with the cutters selectively engaging any faces, edges and surfaces needing reconditioning.

12 Claims, 6 Drawing Sheets

MILLING MACHINE FOR PRESS BRAKE

This invention relates to milling machines which are particularly adapted for reconditioning the tool engaging faces and other surfaces of the ram and bed components of a press brake.

BACKGROUND OF THE INVENTION

Most press brakes wear excessively across the surfaces of the ram and the bed though both proper and improper usage. A common and compromising corrective measure has been to place shims between adjacent tooling, and ram and/or bed surfaces, in an effort to improve the operative alignment of the tooling. This measure is generally unsatisfactory because the load is not transferred equally and proportionately from the tooling die set to the bed and ram of the press brake.

Additionally, excessive shimming causes longer set-up times and thus reduces productivity. In addition, the quality of the part being formed is diminished, often to the point of being unacceptable. The frequent result is that costly parts are scrapped.

U.S. Pat. No. 4,162,565 issued July 31, 1979 discloses a portable milling machine which can be transported to the location of a press brake needing reconditioning. This milling machine comprises an upper way, a lower way and a carriage. The upper way is attached to the upper moving ram member of the press brake and the lower way is attached to the lower fixed bed member of the press brake. Upper carriage support shoes travel along the upper way, and lower carriage support shoes travel along the lower way. Both sets of shoes are mounted on the carriage. While the carriage travels along the press brake, the cutter machines an edge of the press brake.

The installation of two ways, that is, upper and lower ways, requires that two sets of mounting holes be bored in the front faces of the bed and ram members of the press brake undergoing reconditioning. As a result, parallel alignment and the attitude of the two spaced way elements are quite critical often resulting in time consuming adjustments to correct errors in fastening the ways.

Additionally, the design of this prior art milling machine dictates that the movable carriage which supports the cutter be positioned relatively close to the front vertical surfaces of the bed and ram. As a result, this milling machine cannot be used to mill bed and ram surfaces and edges which are incorporated into bed and ram designs having wide, projecting shoulders. These shoulders obstruct the path of the carriage so that it cannot be mounted on the upper and lower ways.

SUMMARY OF THE INVENTION

Accordingly, a principal object of this invention is to simplify the procedure for mounting a portable milling machine on press brakes, thus reducing the set-up time.

Another object is to substantially increase the size of press-brake faces, edges and surfaces that can be milled by portable milling machines.

In applying the milling machine of the invention, only a single series of aligned, tapped, mounting holes are formed in the bed of the press brake to effect set-up. No mounting holes are needed on the ram as is required to mount the upper way of the prior art milling machine of U.S. Pat. No. 4,162,565.

A carriage-support assembly comprising a rigid, elongated beam is bolted to the bed, preferably a measured distance below the spaced junctions of each of the upper faces or edges of the bed adjacent to the two housings of the press brake. A series of spacer rings of selected width separate this beam from the front of the bed so that any tool-holding faces of the bed and ram formed on wide projecting shoulders do not obstruct the carriage which moves the cutter head.

A carriage-feed drive assembly is removably mounted on one end of the beam. This drive assembly incorporates an electric feed motor which rotates a feed screw which drives the carriage the length of the beam.

A milling-head assembly is seated upon the carriage. This assembly includes a cutter holder which is manually adjusted both vertically and laterally by two sets of dovetail slides driven by hand wheels. The cutter holder is also reversible with respect to the milling-head assembly.

Accordingly, the cutters can be manually seated selectively upon the faces, edges, or surfaces of the bed and ram which are to be reconditioned. These cutters are rotated by a reversible electric motor incorporated in the milling-head assembly. Thus, the feed screw drives the carriage-supported cutters the length of the bed and ram to effect the alignment and parallelism needed for reconditioning the press brake.

DESCRIPTION OF THE DRAWINGS

In order that all of the structural features for attaining the objects of this invention may be readily understood, reference is made to the accompanying drawings wherein.

DESCRIPTION OF THE PREFERRED EMBODIMENT

Figure 1:
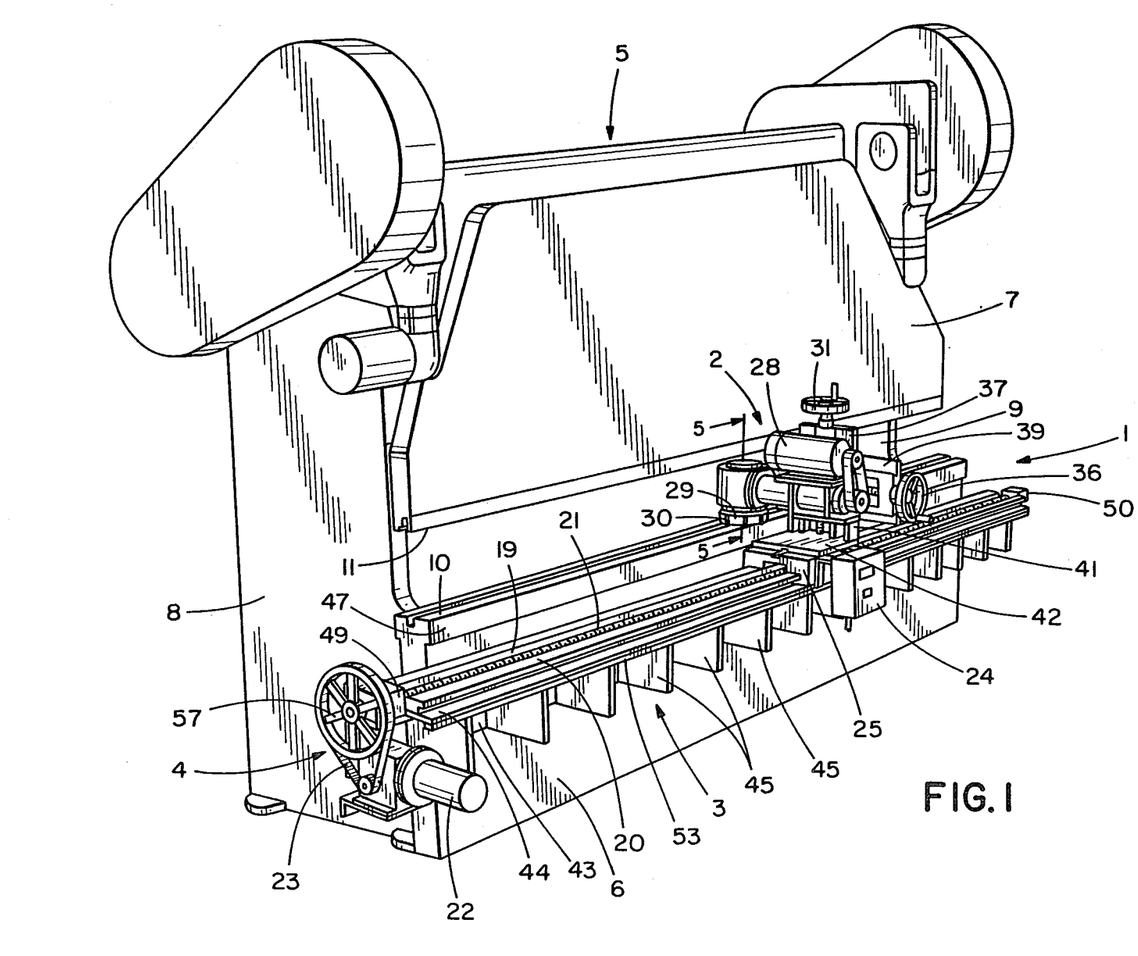
FIG. 1 is a perspective view of the portable milling machine of this invention applied to a conventional press brake.

Referring to the drawings, the principal assemblies of milling machine 1 of this invention ar milling-head assembly 2, carriage-support assembly 3, and carriage-feed drive assembly 4 (FIG. 1). Milling machine 1 is typically applied to a conventional press brake 5 by bolting the entire structure of milling machine 1 to the front face of stationary bed 6 of the press brake. Movable ram 7 cooperates with bed 6; and press-brake housings 8 and 9 support bed 6 and ram 7 in a conventional manner.

When the adjacent mating faces 10 and 11 of bed 6 and ram 7 (FIGS. 3,4) become worn or bent so as to lose uniformity and parrallelism throughout their entire length, press brake 1 ceases to operate properly. The edges of press brake 1, which are defined by faces 10 and 11, hold and support the tooling (not shown) which forms a workpiece to a required shape. Any serious irregularity or misalignment in faces 10 and 11 causes the tooling to mate non-uniformly throughout its length because of the untrue condition of the faces, with the result that the workpiece may be improperly formed. Re-machining bed face 10 and ram face 11, as well as other surfaces which directly support and serve to align the press brake tooling, such as bottom surface 12 of bed tongue slot 13 and top surface 14 of ram tongue slot 15 (FIGS. 3, 4), will return these critical surfaces to their original true operating condition.

Briefly summarized, the structure and mode of operation of milling machine 1 is as follows:

A series of carefully aligned, tapped, mounting holes 16 (FIG. 3) are formed the length of bed 6 a required and measured distance below bed face 10. Thereafter, carriage-support assembly 3, without milling-head assembly 2 and the motor drive for carriage-feed drive assembly 4, is bolted to bed 6 by means of bolts 17 which pass through a group of spacer rings 18. Thereafter, milling-head assembly 2 with its carriage 25 is appropriately seated upon ways 19 and 20 of carriage-support assembly 3 so that milling-head assembly 2 can be driven by feed screw 21 traversing the length of ways 19 and 20.

Feed screw 21 is driven by electric feed motor 22 of carriage-feed drive assembly 4 through pulley belt 23. Fee motor 22 is a reversible motor powered by control box 24 which moves with carriage 25 of milling-head assembly 2.

A T-shaped support block 26 (FIGS. 3,4) is loosely fixed to a groove located in the contoured bottom of carriage 25. Block 26 houses an internally threaded bronze nut 27 which mates with the threads of feed screw 21 so that drive for moving milling-head assembly 2 on carriage-support assembly 3 can be supplied by feed screw 21.

Mill drive motor 28, and cutter holder 29 with its series of circularly disposed cutters 30, are adjustably supported on carriage 25. Vertical-adjust hand wheel 31 provides vertical adjustment for a reversible cutter holder 29 so that cutters 30 can be applied to mill bed face 10 (FIG. 3) or ram face 11 (FIG. 4) as required. Reversal of cutter holder 29 is effected by unscrewing threaded bushing 31 (FIG. 5) and removing cutter-holder retaining bolt 32 from cylindrical 1 bored shaft 33 and reinserting bolt 32 in a reversed direction. Cutter holder 29 can thus be removed from its keyed position on collar 34 and be reapplied to a keyed position on the opposite collar 35.

Lateral-adjust hand wheel 36 provides lateral adjustment for cutter holder 29 so that cutters 30 can be moved to a proper lateral position relative bed face 10 (FIG. 3), or ram face 11 (FIG. 4), to accurately seat cutters 30 on the face to be milled.

Hand wheels 31 and 36 operate two pairs of dove-tail slides (FIG. 6) to effect vertical and lateral adjustment of cutter holder 29. The vertical slide pair comprises vertical-stationary slide 37 and its mating vertically-movable slide 38; and the lateral slide pair comprises a laterally-stationary slide 39 (fixed to slide 38 for vertical movement with slide 38) and its mating laterally-movable slide 40. All of the slides are supported on U-shaped bracket 41 which is fixed o base plate 42, which in turn is fixed to carriage 25.

The controls for energizing and reversing mill drive motor 28 are located within control box 24. Accordingly, when power is applied to feed motor 22 and mill drive motor 28, rotating cutter holder 29 is movable the length of bed 6 and ram 7; and with proper manual adjustment of hand wheels 31 and 36, bed face 10 and ram 11 face can be milled to a trued and parallel condition.

The detailed description of carriage-support assembly 3 and its aligned positioning on bed 6 is as follows:

A rigid, elongated, support beam for ways 19 and 20, upon which carriage 25 is driven, is fabricated by fixing steel side plate 43 to steel top plate 44 by welding a series of spaced gussets 45 (FIGS. 1-3) to the inside surfaces of both plates. In a preferred embodiment a rigid, straight beam 14 feet in length is used. This beam can mill in one set-up press-brake beds ranging up to about 13 feet. For beds larger than 13 feet, a second beam set-up is required.

Figure 2:
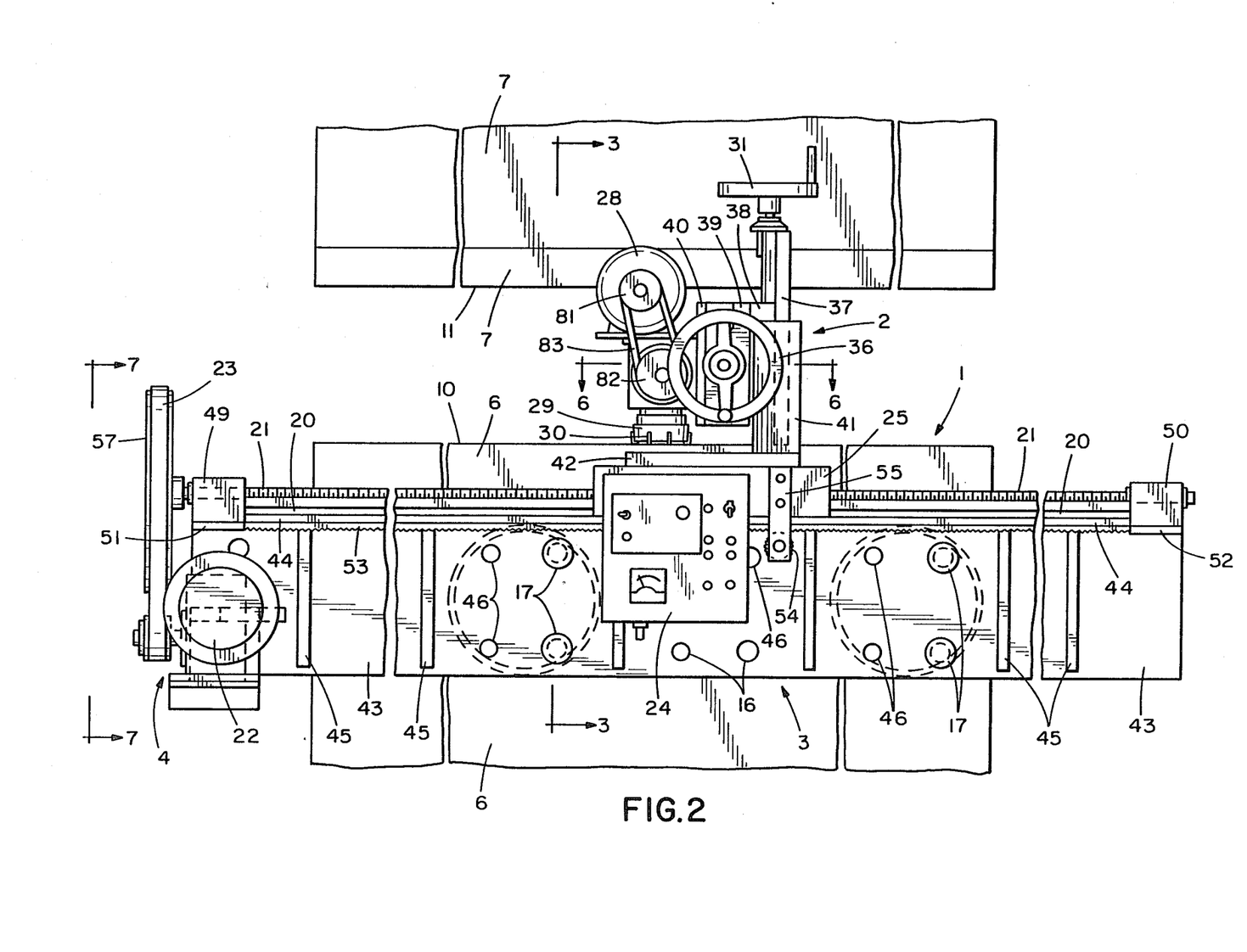
FIG. 2 is a front elevational view of the milling machine of FIG. 1.

Side plate 43 is formed with 13 sets of four enlarged bolt 17 pass-through holes 46 (FIG. 2). In a typical application, where the bed length is of the order of a total of ten feet, five bolts 17 may be applied to adequately secure the beam. In particular, only five of thirteen bolt-holes sets receive a single bolt. Additional bolts 17 can be added if necessary.

When portable milling machine 1 of this invention is brought to the permanent site of a press brake 5 needing reconditioning, the reconditioning operator must locate, drill and tap the necessary number of holes 16 in bed 6 to receive all of the bolts 17 which will be used to mount carriage-support assembly 3. The placement of bolt holes 16 must provide alignment of the beam across the front of bed 6 parallel to the reconditioned bed face 10 that is desired. In general, down measurements made at the opposite ends of bed 6 at the side junctions of bed face 10 to housings 8 and 9, will provide satisfactory end points from which to draw one or more straight lines across the front face of bed 6 from which holes 16 may be accurately located.

The length of bolts 17 to be used is determined by the width of the spacer rings 18 needed to provide adequate separation of milling-head assembly 2 from the adjacent projecting shoulder 47 of bed 6 which serves to define the width of bed face 10 and ram face 11. Accordingly, the greater the projection of shoulder 47 beyond front 48 of bed 6, a greater width of rings 18 will also be required. The ring spacer design of this invention enables the milling of bed and ram faces 10 and 11 having a greater width than those that can be processed by prior-art milling machines for press brakes, such as that of U.S. Pat. No. 4,162,565 issued July 31, 1979.

As previously stated, holes 46 are somewhat oversized relative the shank diameter of bolts 17; accordingly, a limited adjustment can be made to properly align the beam of the carriage-support assembly 3 relative bed face 10.

Feed screw 21, which is part of carriage-feed drive assembly 4, extends the length of top plate 44, with the opposite ends of the feed screw being supported on bearing blocks 49 and 50 (FIG. 2). Bearing blocks 49 and 50 are seated upon support brackets 51 and 52 which are fixed to plate 44.

Optional manual drive for carriage 25 is provided by an elongated rack 53 (FIG. 2) which is fixed to the bottom of plate 44. Rack 53 is engaged by a pinion 54 which is supported on a bar bracket 55 fixed to carriage 25. When pinion shaft 56 (FIG. 4) is manually rotated by a hand wheel (not shown) carriage 25 is driven along the length of carriage-support assembly 3.

Figures 6, 7, 8:
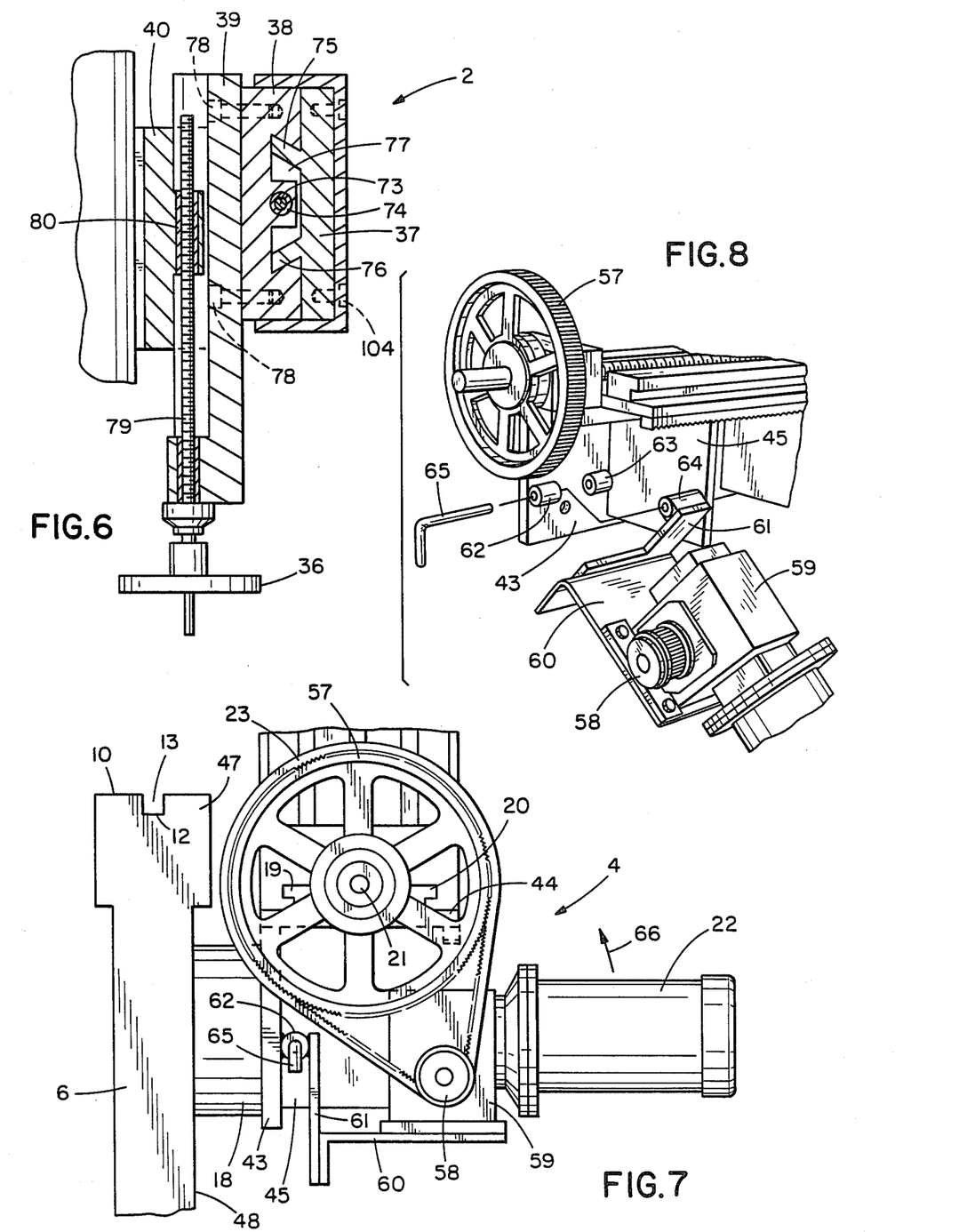
FIG. 6 is a section view taken along line 6—6 of FIG. 2 which shows the horizontal-adjust hand wheel and its associated slides used in the milling-head assembly.
FIG. 7 is an elevation view taken along line 7—7 of FIG. 2 which shows details of the carriage-feed drive assembly.
FIG. 8 is a view which shows the details of the pivot-pin hinge employed in the carriage-feed drive assembly.

The detailed description of carriage-feed drive assembly 4 is as follows:

A large toothed pulley 57 (FIGS. 1, 2, 7, 8) is fixed to the projecting end of feed screw 21 adjacent bearing block 49. Toothed pulley belt 23 couples large pulley 57 to small toothed pulley 58. When feed motor 22 drives small pulley 58 through gear reduction box 59, the resulting motion of belt 23 drives large pulley 57 which in turn drives feed screw 21. Gear box 59 and motor 22 are preferably fabricated as a single unit fixed to movable hinge bracket comprising L-shaped base 60 fixed to hinge leaf plate 61 (FIGS. 7, 8). A pair of spaced cylindrical hinge-pin collars 62 and 63 are fixed to side plate 43, and a single mating hinge-pin collar 64 designed to fit between collars 62 and 63 is fixed to hinge leaf plate 61.

When hinge-pin collars 62, 63, and 64 are in axial alignment, and L-shaped hinge pin 65 is inserted in the composite bore formed by the three collars, motor 22 and gear box 59 are positioned as shown in FIG. 7 of pulley belt 23 to engage pulleys 57 and 58. Carriage-feed drive assembly 4 can be disengaged and removed from milling machine 1, by elevating motor 22 in the direction of arrow 66 and removing belt 23 from engagement with pulleys 57 and 58. If hinge pin 65 is in place, motor 22 will drop in a direction opposite to arrow 66. The subsequent withdrawal of hinge pin 65 from collars 62, 63 and 64 will free motor 25 and its associated structure from milling machine 1.

The detailed description of milling-head assembly 2 is as follows:

A first set of three bronze bearing plates 67, 68 and 69 (FIGS. 3, 4) are fixed to the bottom contoured surfaces of carriage 25 so as to be slideably seated upon way 19 and a second set of three bronze bearing plates 70, 71 and 72 are likewise fixed to the bottom countoured surfaces of carriage 25 so as to be slideably seated upon way 20. These bronze plates enable carriage 25 to freely slide on ways 19 and 20.

Figure 3:
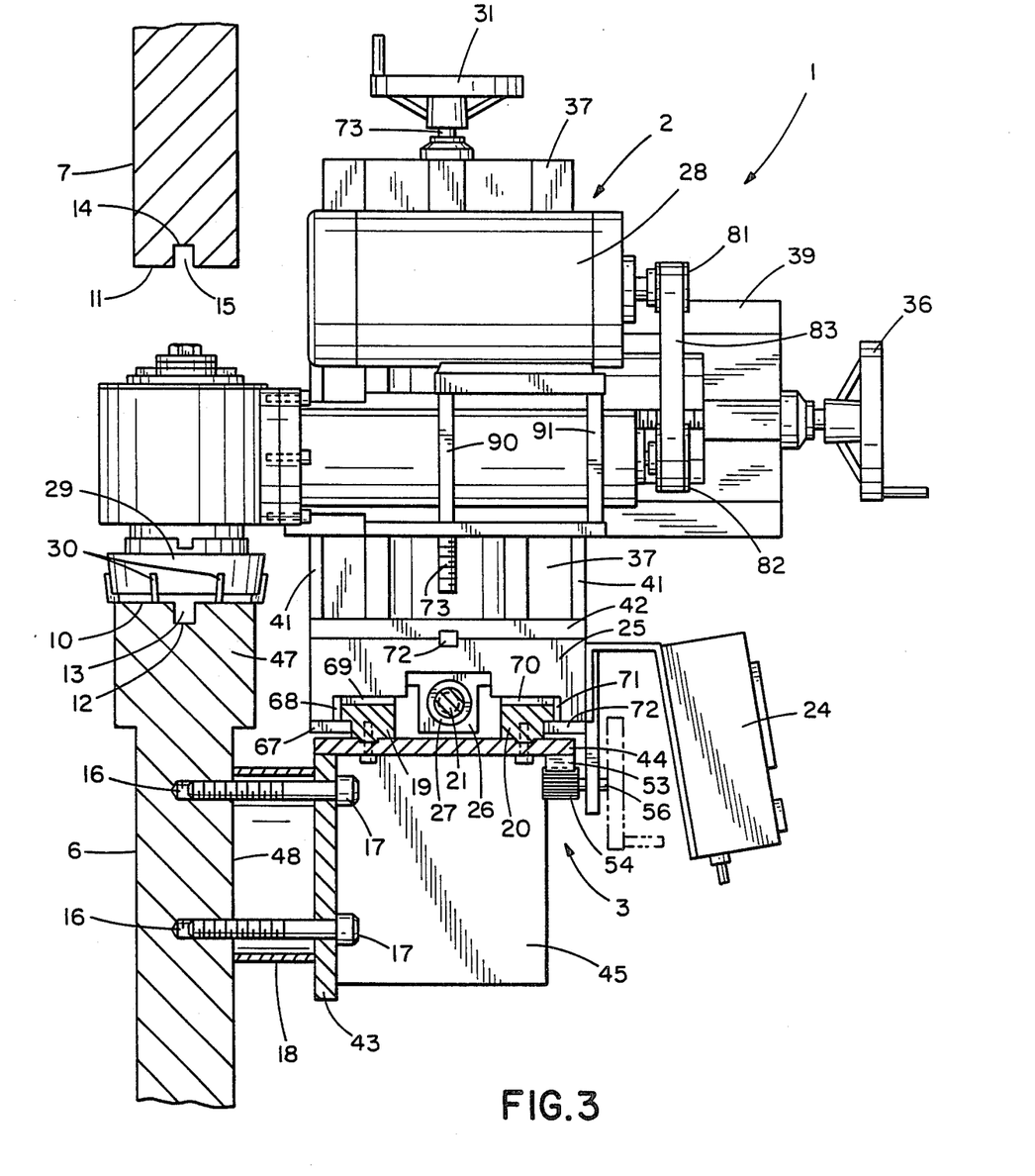
FIG. 3 is a section view taken along line 3—3 of FIG. 2 which shows the cutter head applied to the top face of the bed.
Figure 4:
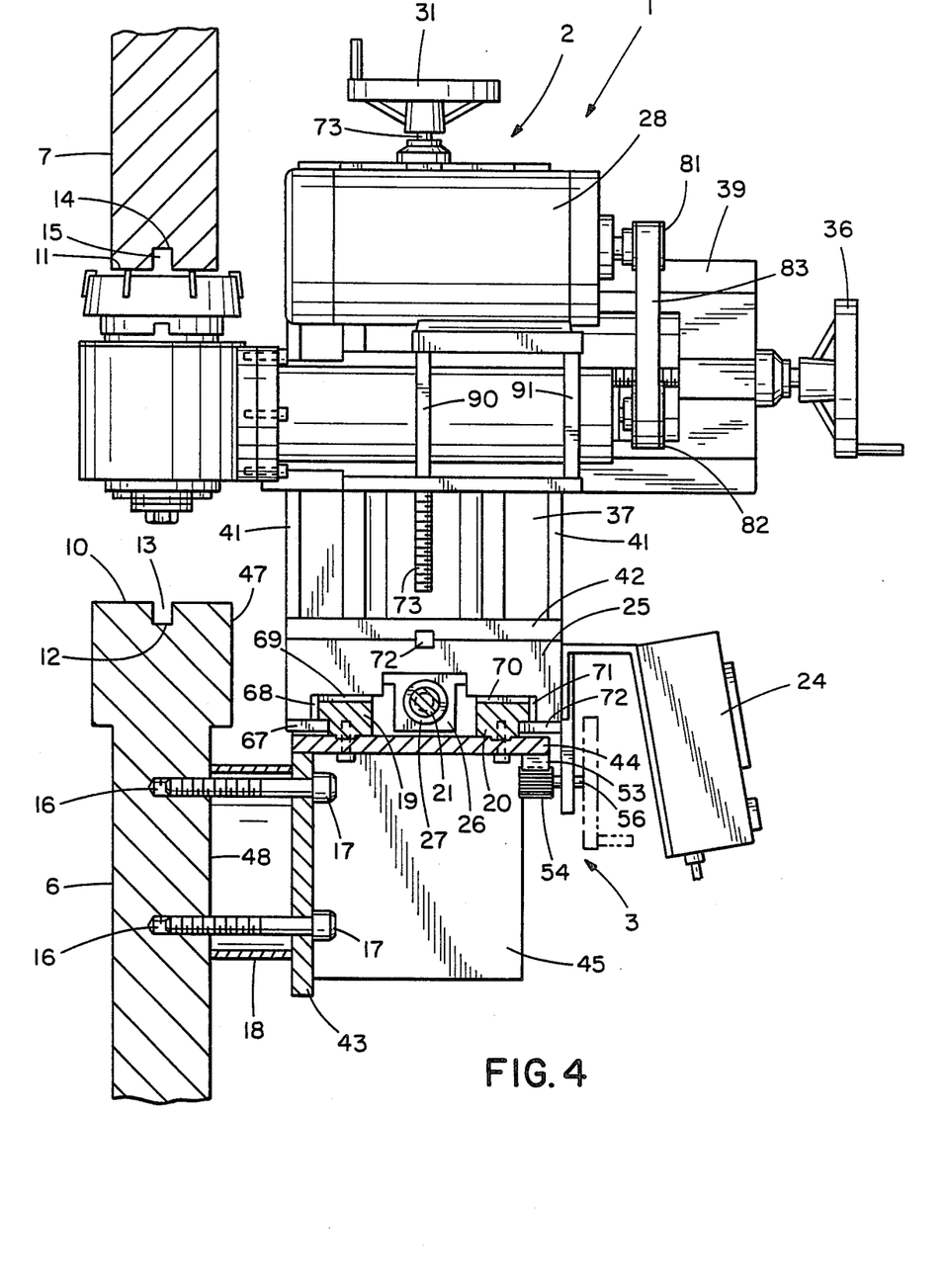
FIG. 4 is a view related to FIG. 3 which shows the cutters applied to the bottom face of the ram.
Figure 5:
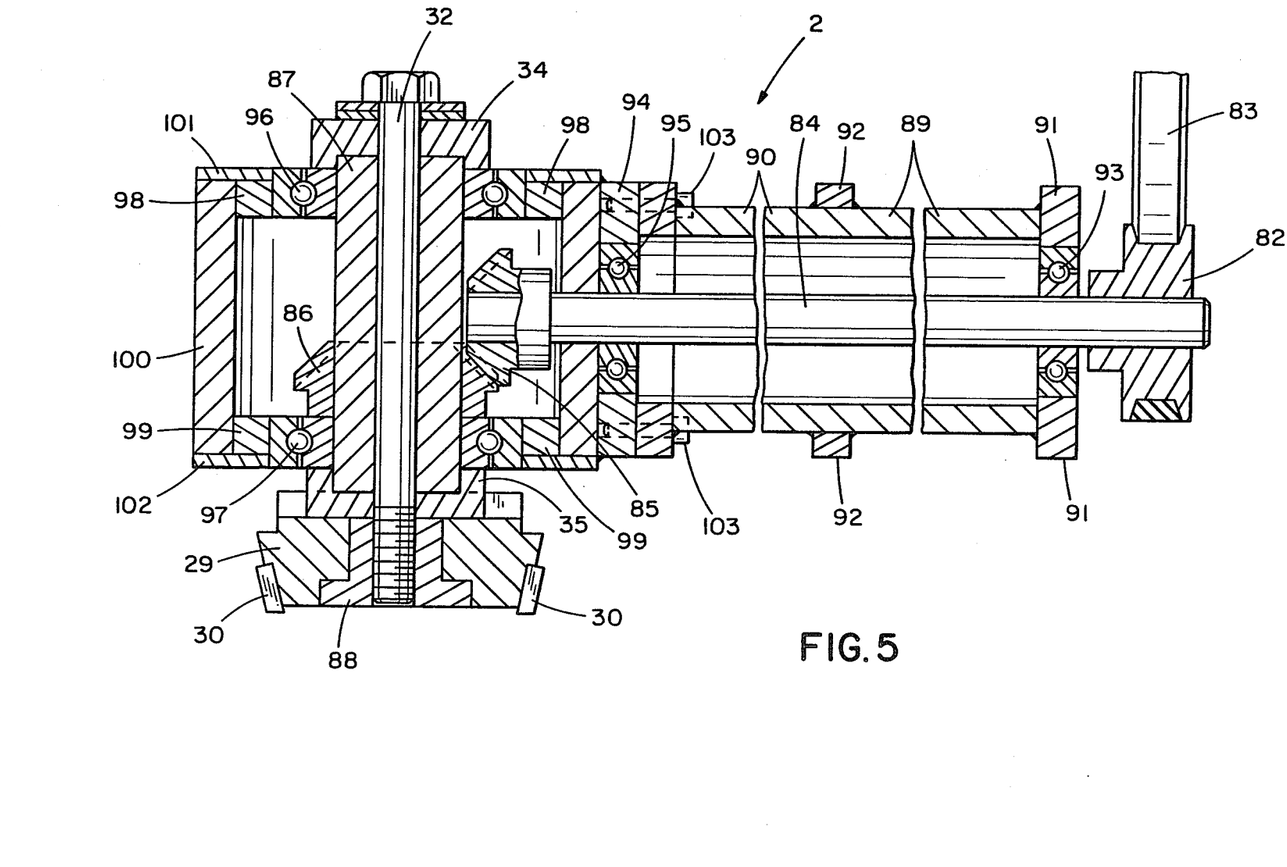
FIG. 5 is a section view taken along line 5—5 of FIG. 1 which shows the gear-drive mechanism used to rotate the cutters.

Base plate 42 is locked to carriage 25 by elongated bar key 72 (FIGS. 3, 4). Accordingly, carriage 25 and all milling-head assembly components 2 supported on plate 42 move in unison with carriage 25. As previously noted, U-shaped bracket 41 is fixed to the upper suface of base plate 42. Bracket 41 supports the four slides 37, 38, 39 and 40 so that all components carried on laterally-movable slide 40 are not only movable laterally, but also are movable vertically in response to the manual rotation of hand wheels 31 and 36. Vertical-adjust hand wheel 31 rotates an elongated threaded shaft 73 (FIGS. 3, 6) which engages a mating threaded nut 74 fixed to vertical-movable slide 39. Shaft 73 is supported on vertical-stationary slide 37 which is fixed t U-shaped bracket 41 by bolts 104. Slide 37 is formed with a pair of spaced dovetail wings 75 and 76 which are locked into mating dovetail groove 77 formed in slide 38. Accordingly, rotation of vertical-adjust hand wheel 31, rotates shaft 73 which in turn drives threaded nut 74 in a vertical direction. The movement of nut 74 carries slide 38 in a vertical direction. All other components fixed to slide 38 are also moved vertically. These components include laterally-stationary slide 39 which is fixed to slide 38 by a set of bolts 78.

Lateral-adjust hand wheel 36 rotates an elongated threaded shaft 79 which is supported on lateral-stationary slide 39 which engages a mating threaded nut 80 fixed to lateral-movable slide 40. Slide 39 is formed with a pair of dovetail wings (not shown) similar to dovetail wings 75 and 76 of vertical-stationary slide 37, and slide 40 is formed with a dovetail groove similar to dovetail groove 77 formed in vertically-movable slide 38. Accordingly, rotation of lateral-adjust hand wheel 36, rotates shaft 79, which in turn drives threaded nut 80 in a lateral direction.

Since mill-drive motor 28, cutter holder 29, and all components which connect motor-output shaft rotation to drive cutter holder 29 are supported on slide 40, these components follow the composite vertical and lateral movements dictated by hand wheels 31 and 36.

Motor output pulley 81 rotates bevel-gear pulley 82 (FIG. 5) through pulley belt 83. Bevel-gear drive shaft 84 rotates input bevel gear 85, which in turn drives output bevel gear 86. Output bevel gear 86 is fixed to bored shaft 87 which is in turn rotated responsively. Collars 34 and 35 are keyed to opposite ends of bored shaft 87, and the engagement of cutter-holder retaining bolt 32 by threaded bushing nut 88, locks cutter holder 29 to bored shaft 87. Accordingly, the output of mill-drive motor 28 is coupled to cutter holder 29 through components 81, 83, 82, 84, 85, 86, 87, 34 or 35, and 32-88.

Cylindrical shaft housings 89 and 90 are fixed to and supported on slide 40 by a pair of spaced support brackets 91 and 92. Bracket 91 serves as a housing for ball bearing 93, and ring 94 serves as a housing for ball bearing 95. Bearings 94 and 95 rotatably support drive shaft 84.

Ball bearings 96 and 97 rotatably support bored shaft 87 and the components 34, 35, 32, 29 and 88 that rotate with shaft 37. Bearings 96 and 97 are supported by bearings 98 and 99 which are housed within a cage defined by gear housing 100 and end plates 101 and 102. Bolts 103 fix gear housing 100 to shaft housing 90.

The above structure is illustrative of a preferred application of the principles of this invention. It should be understood, however, that structural changes can be made without departing from the principles of this invention.

What is claimed is:

1. In the combination of a press brake having bed and ram members with tool-holding faces, edges and surfaces located at the upper portion of the bed and the lower portion of the ram needing reconditioning due to wear, and a portable milling machine adapted to be fixed solely to the bed of the press brake to mill and thus recondition the faces, edges and surfaces, the improved milling machine comprising an elongated carriage-support assembly attached to the bed for support and separated from the ram so that the bed provides the sole support for the carriage support assembly and the milling machine, a milling-head assembly having a carriage and a set of cutters seated on the carriage and including means for the alternative milling of the ram or bed with the milling-head assembly being mounted on the carriage-support assembly, and a carriage-feed drive assembly coupled to the carriage to drive the milling-head assembly the length of the carriage-support assembly with the cutters selectively engaging the faces, edges and surfaces of both the bed and ram needing reconditioning.

2. The combination of claim 1 in which the carriage-support assembly comprises an elongated beam fixed to a front face of the bed.

3. The combination of claim 2 comprising a set of spacers separating the beam from the front face of the bed.

4. The combination of claim 3 in which the spacers are a set of rings located between the front face of the bed and the beam.

5. The combination of claim 2 in which the carriage-feed drive assembly includes a feed screw which extends the length of the beam and which engages the carriage.

6. The combination of claim 5 comprising a feed-screw drive motor removably mounted on one end of the beam.

7. In the combination of a press brake having bed and ram members with tool-holding faces, edges and surfaces located at the upper portion of the bed and at the lower portion of the ram needing reconditioning due to wear, and a portable milling machine adapted to be fixed solely to the bed of the press brake to mill and thus recondition the faces, edges and surfaces, the improved milling machine comprising an elongated carriage-support assembly attached to and supported entirely by the bed and separated from the ram so that the milling machine is not supported by the ram, the carriage-support assembly including a set of elongated ways lying in a plane generally parallel to the planes of both the ram and bed faces, a milling-head assembly having a carriage and a set of cutters seated on the carriage and including means for the alternative milling of the ram or bed with the milling-head assembly being mounted on the carriage-support assembly, and a carriage-feed drive assembly coupled to the carriage to drive the milling-head assembly along the length of the carriage-support assembly with the cutters selectively engaging the faces, edges and surfaces of both the bed and ram needing reconditioning.

8. The combination of claim 7 in which the carriage-support assembly includes an elongated beam secured to a front face of the bed, and the carriage-feed drive assembly includes a feed screw extending at least substantially the length of the beam and a motor supported at one end of the beam coupled to the feed screw.

9. The combination of claim 8 in which the milling-head assembly includes a set of vertical-adjust slides and a set of lateral-adjust slides supported on and movable with the carriage, and in which the positioning of the cutter is adjustable in response to the relative positioning of each set of slides.

10. The combination of claim 9 in which the cutters are reversibly mounted on the slides so as to mill selectively the bed or ram as required.

11. The combination of claim 8 comprising a set of spacers separating the beam from the front face of the bed.

12. The combination of claim 10 comprising a set of spacers separating the beam from the front face of the bed.

* * * * *